United States Patent
Hanada et al.

(10) Patent No.: US 6,980,539 B2
(45) Date of Patent: Dec. 27, 2005

(54) MOBILE COMMUNICATION SYSTEM IN MULTI-CARRIER CDMA SCHEME USING SHORT CODE AND LONG CODE

(75) Inventors: Yukiko Hanada, Kanagawa-ken (JP);
Kenichi Higuchi, Kanagawa-ken (JP);
Sadayuki Abeta, Kanagawa-ken (JP);
Mamoru Sawahashi, Kanagawa-ken (JP)

(73) Assignee: NTT DoCoMo, Inc., Tokyo (JP)

( * ) Notice: Subject to any disclaimer, the term of this patent is extended or adjusted under 35 U.S.C. 154(b) by 727 days.

(21) Appl. No.: 09/985,491

(22) Filed: Nov. 5, 2001

(65) Prior Publication Data

US 2002/0055357 A1 May 9, 2002

(30) Foreign Application Priority Data

Nov. 6, 2000 (JP) ............................. 2000-337993

(51) Int. Cl.[7] ............................................. H04B 7/216
(52) U.S. Cl. .................... 370/342; 370/335; 370/441; 375/140; 375/145; 375/146; 375/147; 375/149
(58) Field of Search ................................ 370/335, 342, 370/441; 375/140, 145, 146, 147, 149

(56) References Cited

U.S. PATENT DOCUMENTS

| | | | | |
|---|---|---|---|---|
| 5,673,260 A | * | 9/1997 | Umeda et al. | 370/342 |
| 5,724,378 A | * | 3/1998 | Miki et al. | 375/148 |
| 5,757,766 A | | 5/1998 | Sugita | |
| 5,910,948 A | * | 6/1999 | Shou et al. | 370/335 |
| 6,038,250 A | * | 3/2000 | Shou et al. | 375/143 |
| 6,163,533 A | * | 12/2000 | Esmailzadeh et al. | 370/342 |
| 6,208,632 B1 | * | 3/2001 | Kowalski et al. | 370/335 |
| 6,370,130 B1 | * | 4/2002 | Zhou et al. | 370/335 |
| 6,373,880 B1 | * | 4/2002 | Ichihara | 375/141 |

FOREIGN PATENT DOCUMENTS

| | | |
|---|---|---|
| EP | 0 910 181 | 4/1999 |
| EP | 0 929 161 | 7/1999 |
| EP | 0 930 723 A2 | 7/1999 |
| EP | 0 944 178 A2 | 9/1999 |
| EP | 1 039 684 | 9/2000 |
| EP | 0 892 503 B1 | 8/2004 |
| JP | 11-196460 | 7/1999 |
| KR | 2000-0047150 | 7/2000 |
| KR | 2001-0051003 | 6/2001 |

OTHER PUBLICATIONS

H. Atarashi, et al., The Institute of Electronics, Information & Communication Engineers, Communication Society Meeting 2000, NTTD-267, pp. 529-530, "Performance of Broadband MC-CDMA Packet Wireless Access Using Multi-Level Modulation and Hybrid ARQ in Forward Link", Sep. 7, 2000.

(Continued)

Primary Examiner—Dang Ton
Assistant Examiner—Jay P. Patel
(74) Attorney, Agent, or Firm—Oblon, Spivak, McClelland, Maier & Neustadt, P.C.

(57) ABSTRACT

In the mobile communication system in the multi-carrier CDMA scheme, data to be transmitted by the radio base station are doubly spread by using a long code that is unique to each radio base station and to be used in identifying each radio base station, in addition to a short code to be used in identifying each mobile station. The long code has a repetition period longer than or equal to the number of sub-carriers used for transmission.

18 Claims, 11 Drawing Sheets

OTHER PUBLICATIONS

S. Abeta, et al., IEEE VTS 52nd Vehicular Technology Conference, vol. 5 of 6, XP-000988409, pp. 2213-2218, "Forward Link Capacity of Coherent DS-CDMA and MC-CDMA Broadband Packet Wireless Access in a Multi-Cell Environment", Sep. 24, 2000.

K. Higuchi, et al., IEEE 47th Vehicular Technology Conference, XP-010229096, pp. 1430-1434, "Fast Cell Search Algorithm in DS-CDMA Mobile Radio Using Long Spreading Codes", May 4, 1997.

H. Atarashi, et al., IEICE Trans. Fundamentals, vol. E84-A, No. 7, XP-001025070, pp. 1670-1680, "Performance Evaluation of Coherent High-Speed TD-OFCDM Broadband Packet Wireless Access in Forward Link Employing Multi-Level Modulation and Hybrid ARQ", Jul. 1, 2001.

D. Mottier, et al., IEEE VTS 52nd Vehicular Technology Conference, vol. 3 of 6, XP-000988578, pp. 1270-1275, "A Spreading Sequence Allocation Procedure for MC-CDMA Transmission Systems", Sep. 24, 2000.

* cited by examiner

MOBILE COMMUNICATION SYSTEM IN MULTI-CARRIER CDMA SCHEME USING SHORT CODE AND LONG CODE

BACKGROUND OF THE INVENTION

1. Field of the Invention

The present invention relates to a mobile communication system in the multi-carrier CDMA (Code Division Multiple Access) scheme.

2. Description of the Related Art

The CDMA scheme in which each communicating party is identified by using a spreading code allocated to each communicating party and a plurality of communicating parties carry out communications using the identical frequency band has been known conventionally. The next generation mobile communication scheme called IMT-2000 adopts a radio access scheme called wideband direct spreading (DS) CDMA scheme (which will be referred to as W-CDMA scheme hereafter) which uses the spreading bandwidth of 5 MHz or more.

In the downlink of this W-CDMA scheme, each communicating party is identified by using a short code having a repetition period equal to a data symbol period, which is a spreading code allocated to each communicating party at a radio base station. On the other hand, a radio mobile station identifies each radio base station by using a long code having a much longer repetition period compared with the short code.

Figures 1A, 1B:
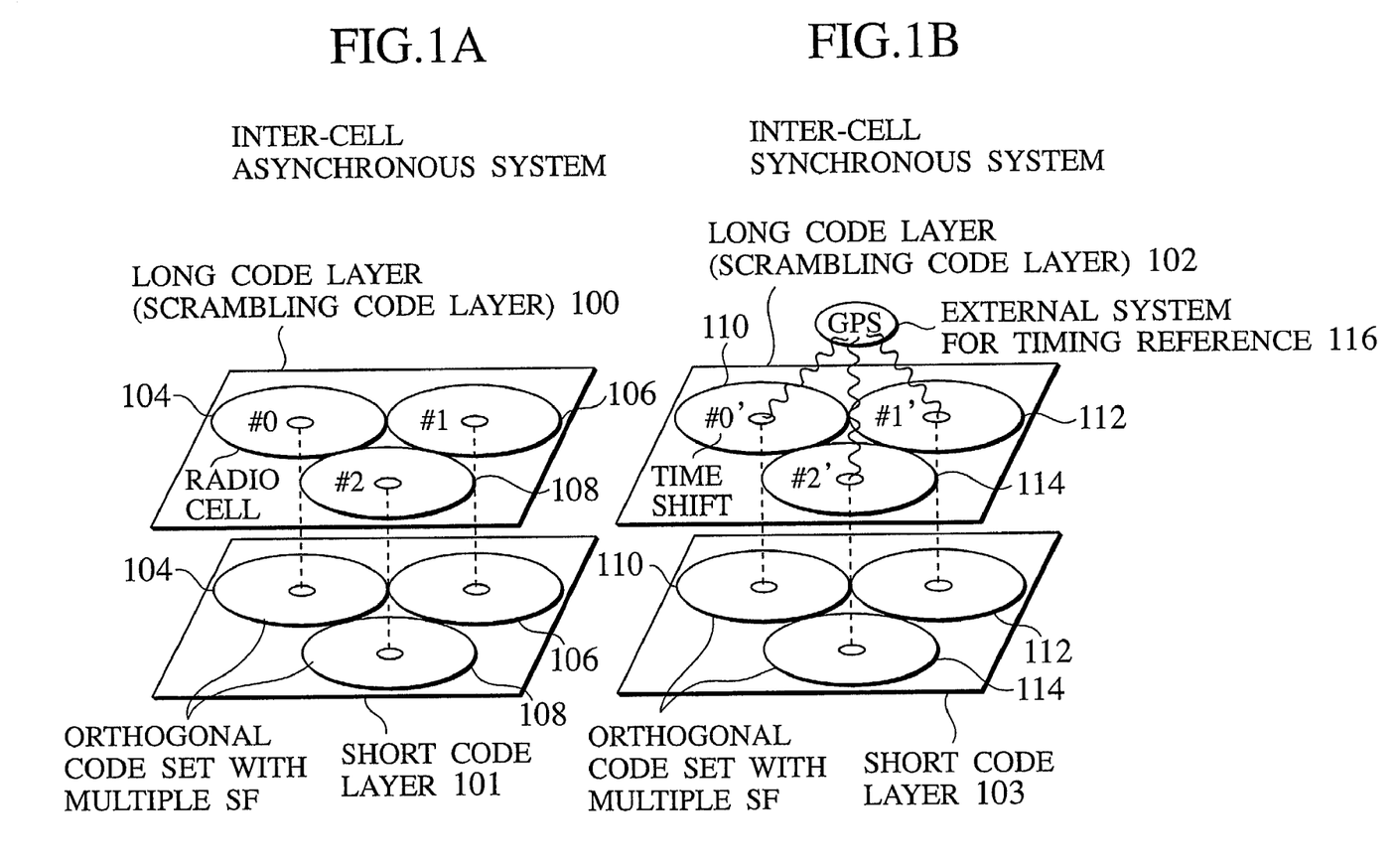
FIGS. 1A and 1B are schematic diagrams showing conventional spreading code allocation methods in the downlink of an inter-cell asynchronous system and an inter-cell synchronous system, respectively.

FIGS. 1A and 1B show the conventional spreading code allocation methods in the downlink of an inter-cell asynchronous system and an inter-cell synchronous system, respectively. As shown in FIG. 1A, the W-CDMA scheme adopts the inter-cell asynchronous system that requires no external system for the purpose of the timing synchronization, in which long codes #0, #1 and #2 that are different for different radio base stations are used in order to identify radio base stations of respective cells 104, 106 and 108 at a long code layer 100. Note that the long code is also referred to as a scrambling code in a sense that it scrambles signals from the other codes as noises.

On the other hand, the cdma2000 scheme that has been proposed in the United States as a candidate for the IMT-2000 instead of the W-CDMA scheme or the conventionally known IS-95 scheme realizes the inter-cell synchronous system as shown in FIG. 1B, which uses a GPS 116 or the like to provide a timing reference common to all the radio base stations 110, 112 and 114 at the long code layer 102. In this system, the radio base stations are identified by using a single type of a long code to which different timing shifts #0', #1' and #2' are given.

Now, as a radio access scheme of the mobile communication system after the IMT-2000, the adoption of a method for transmitting signals by using multiple carriers such as a multi-carrier DS-CDMA scheme or a multi-carrier CDMA scheme is currently under the discussion. Here, the multi-carrier CDMA scheme is a transmission scheme which transmits signals by using a plurality of sub-carriers by arranging copies of the data symbol on a frequency axis and multiplying each of them with the spreading code on that frequency axis. In this multi-carrier CDMA scheme, a plurality of communicating parties will carry out communications by using the identical frequency band simultaneously.

However, the discussion regarding the multi-carrier CDMA scheme so far has been mainly focused on the discussion of the performance evaluation at the link level and the timing and frequency synchronization. Although the multi-carrier CDMA scheme also identifies the communicating party by using the spreading code allocated to each communicating party similarly as in the conventional DS-CDMA scheme, there has been no discussion of a method for efficiently allocating the spreading code conventionally.

Also, in the case of using the multi-carrier CDMA scheme as the mobile communication scheme, although there is a need to identify radio base station just as in the case of using the W-CDMA scheme, there has been no discussion of a method for realizing this.

BRIEF SUMMARY OF THE INVENTION

It is therefore an object of the present invention to provide a mobile communication system which is capable of using the spreading codes efficiently when the multi-carrier CDMA scheme is adopted as the mobile communication scheme.

According to one aspect of the present invention there is provided a method for allocating spreading codes in a mobile communication system in which a radio base station transmits signals by copying each data symbol of a data symbol sequence to be transmitted and arranging copied data symbols on a frequency axis, multiplying the copied data symbols arranged on the frequency axis by the spreading codes, and transmitting a spreading code multiplied data symbol sequence by using a plurality of sub-carriers, the method comprising the steps of: allocating common short codes to all radio base stations, the short codes being spreading codes having a repetition period equal to a number of copies made from one data symbol which are to be used in identifying mobile stations; and allocating one or more long codes uniquely to each radio base station, the long codes being spreading codes having a repetition period longer than the number of copies made from one data symbol which are to be used in identifying each base station.

According to another aspect of the present invention there is provided a method for transmitting signals from a radio base station in a mobile communication system, the method comprising the steps of: (a) copying each data symbol of a data symbol sequence to be transmitted and arranging copied data symbols on a frequency axis; (b) doubly spreading the data symbol sequence, to obtain a spread data symbol sequence, by multiplying the copied data symbols arranged on the frequency axis by spreading codes including a short code and a long code, the short code being a code having a repetition period equal to a number of copies made from one data symbol, and the long code being a code having a repetition period longer than the number of copies made from one data symbol; and (c) transmitting the spread data symbol sequence by using a plurality of sub-carriers.

According to another aspect of the present invention there is provided a method for receiving signals at a mobile station in a mobile communication system, the method comprising the steps of: (a) receiving a spread data symbol sequence transmitted from a radio base station by using a plurality of sub-carriers; and (b) doubly despreading the spread data symbol sequence, to obtain a despread data symbol sequence, by multiplying the spread data symbol sequence by spreading codes including a short code and a long code, the short code being a code having a sequence length shorter than that of the long code, and combining a number of spreading code multiplied data symbols equal to the sequence length of the short code.

According to another aspect of the present invention there is provided a transmitter device for transmitting signals from a radio base station in a mobile communication system, the transmitter device comprising: a copying unit configured to copy each data symbol of a data symbol sequence to be transmitted and arrange copied data symbols on a frequency axis; a spreading unit configured to doubly spread the data symbol sequence, to obtain a spread data symbol sequence, by multiplying the copied data symbols arranged on the frequency axis by spreading codes including a short code and a long code, the short code being a code having a repetition period equal to a number of copies made from one data symbol, and the long code being a code having a repetition period longer than the number of copies made from one data symbol; and a transmitting unit configured to transmit the spread data symbol sequence by using a plurality of sub-carriers.

According to another aspect of the present invention there is provided a receiver device for receiving signals at a mobile station in a mobile communication system, the receiver device comprising: a receiving unit configured to receive a spread data symbol sequence transmitted from a radio base station by using a plurality of sub-carriers; and a despreading unit configured to doubly despread the spread data symbol sequence, to obtain a despread data symbol sequence, by multiplying the spread data symbol sequence by spreading codes including a short code and a long code, the short code being a code having a sequence length shorter than that of the long code, and combining a number of spreading code multiplied data symbols equal to the sequence length of the short code.

According to another aspect of the present invention there is provided a computer usable medium having computer readable program codes embodied therein for causing a computer to function as a transmitter device for transmitting signals from a radio base station in a mobile communication system, the computer readable program codes include: a first computer readable program code for causing said computer to copy each data symbol of a data symbol sequence to be transmitted and arrange copied data symbols on a frequency axis; a second computer readable program code for causing said computer to doubly spread the data symbol sequence, to obtain a spread data symbol sequence, by multiplying the copied data symbols arranged on the frequency axis by spreading codes including a short code and a long code, the short code being a code having a repetition period equal to a number of copies made from one data symbol, and the long code being a code having a repetition period longer than the number of copies made from one data symbol; and a third computer readable program code for causing said computer to transmit the spread data symbol sequence by using a plurality of sub-carriers.

According to another aspect of the present invention there is provided a computer usable medium having computer readable program codes embodied therein for causing a computer to function as a receiver device for receiving signals at a mobile station in a mobile communication system, the computer readable program codes include: a first computer readable program code for causing said computer to receive a spread data symbol sequence transmitted from a radio base station by using a plurality of sub-carriers; and a second computer readable program code for causing said computer to doubly despread the spread data symbol sequence, to obtain a despread data symbol sequence, by multiplying the spread data symbol sequence by spreading codes including a short code and a long code, the short code being a code having a sequence length shorter than that of the long code, and combining a number of spreading code multiplied data symbols equal to the sequence length of the short code.

Other features and advantages of the present invention will become apparent from the following description taken in conjunction with the accompanying drawings.

DETAILED DESCRIPTION OF THE INVENTION

Referring now to FIGS. 2A and 2B to FIG. 11, one embodiment of the mobile communication system according to the present invention will be described in detail.

In the following description, the "short code" refers to a short period spreading code which is a code having a repetition period equal to the number of copies made for one data symbol, and the "long code" refers to a long period scrambling code which is a code having a repetition period longer than the number of copies made for one data symbol.

In this embodiment, the data symbol sequence to be transmitted by the radio base station will be multiplexed by one of the short period spreading codes and one of the long period scrambling codes, where each radio base station is allocated with one or more long period scrambling codes.

Figures 2A, 2B:
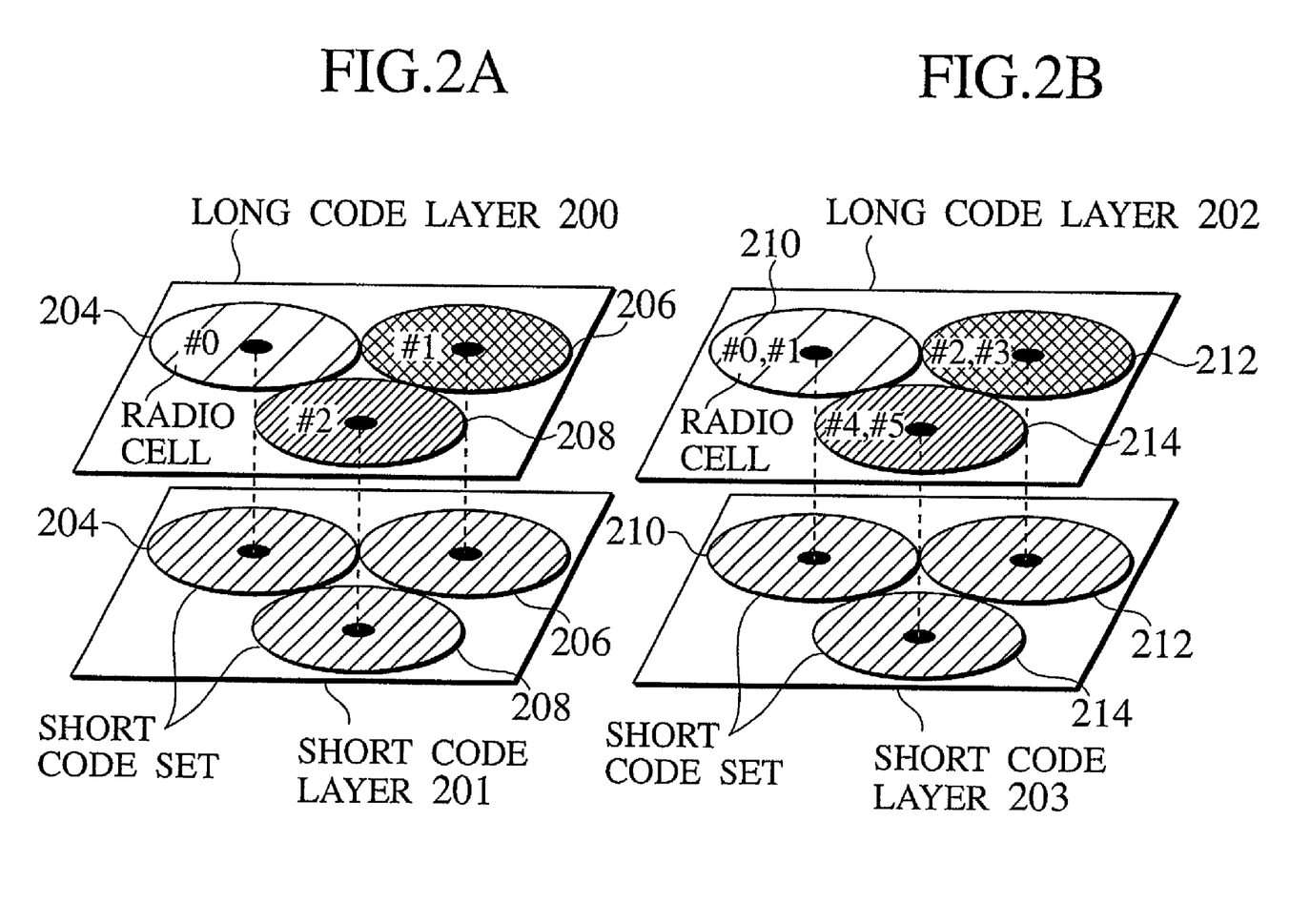
FIGS. 2A and 2B are schematic diagram showing exemplary spreading code allocation methods for the mobile communication system in the multi-carrier CDMA scheme according to one embodiment of the present invention.

FIGS. 2A and 2B show exemplary spreading code allocation methods for the mobile communication system in the multi-carrier CDMA scheme according to this embodiment.

In an example shown in FIG. 2A, a set of short codes for identifying communicating parties (mobile stations) at a short code layer 201 is commonly used by all radio base stations 204, 206 and 208. Also, a different one of the long codes for identifying radio base stations at a long code layer 200 is allocated to each radio base station, such that the long code #0 is allocated to a radio cell 204, the long code #1 is allocated to a radio cell 206, and the long code #2 is allocated to a radio cell 208.

In an example shown in FIG. 2B, a set of short codes for identifying communicating parties (mobile stations) at a short code layer 203 is commonly used by all radio base stations 210, 212 and 214. Also, different two of the long codes for identifying radio base stations at a long code layer 202 are allocated to each radio base station, such that the long codes #0 and #1 are allocated to a radio cell 210, the long codes #2 and #3 are allocated to a radio cell 212, and the long codes #4 and #5 are allocated to a radio cell 214.

In this way, different long period scrambling codes are allocated to different base stations, so that the common short period spreading codes can be commonly used by all the base stations, and therefore the spreading codes can be used efficiently.

In addition, the same frequency can be used at all the base station (that is, it is possible to realize one cell frequency usages).

Figure 3:
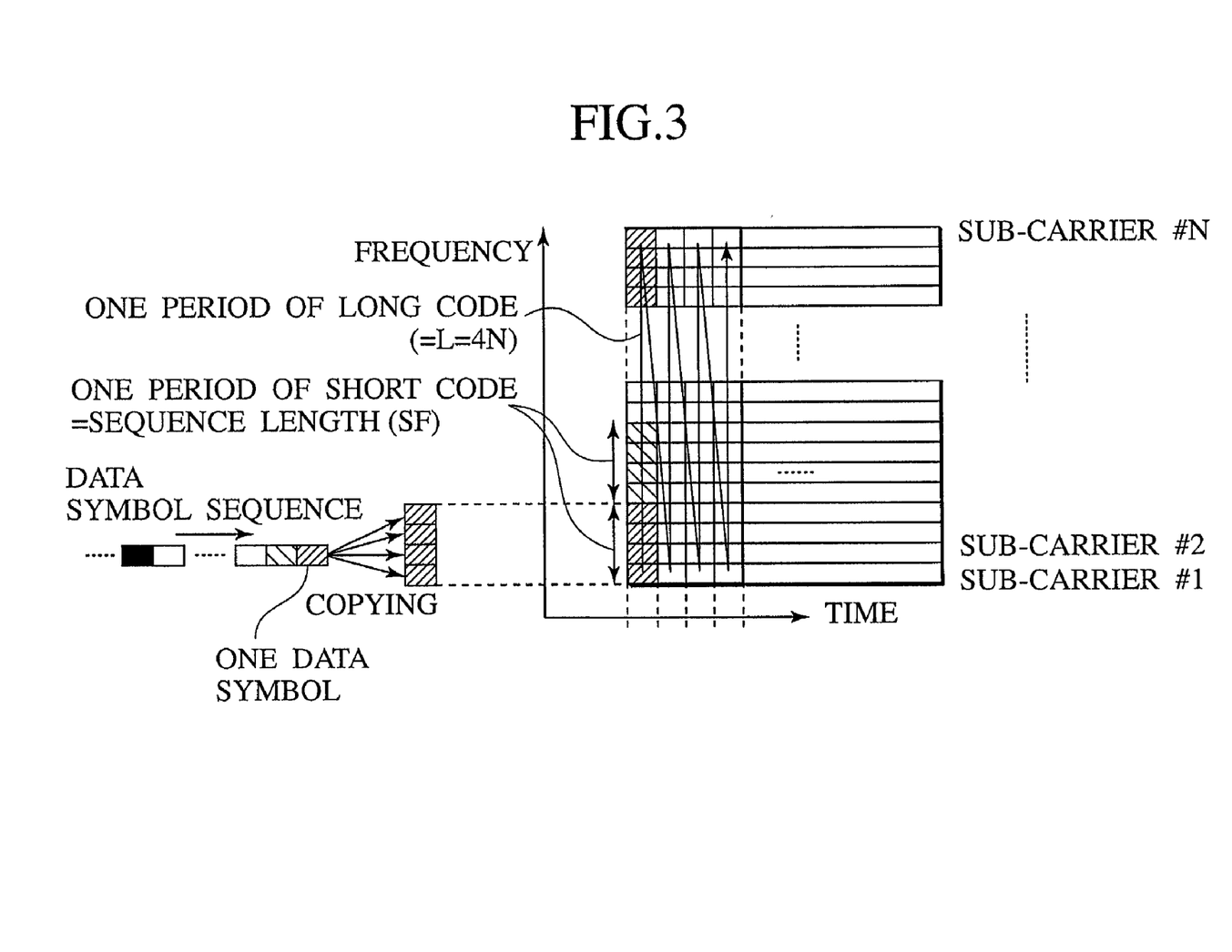
FIG. 3 is a diagram showing one exemplary method for multiplying the spreading codes with the data symbols at a radio base station of the mobile communication system in the multi-carrier CDMA scheme according to one embodiment of the present invention.

FIG. 3 shows one exemplary method for multiplying the spreading codes with the data symbols at a time of transmitting signals at a radio base station of the mobile communication system in the multi-carrier CDMA scheme according to this embodiment.

In an example shown in FIG. 3, the sequence length SF of the short code is equal to four, and the sequence length L of the long code is four times the number of sub-carriers N, i.e., L=4N. Here, the sequence length has the same meaning as the repetition period of the spreading code, and N is a natural number.

In the case where the sequence length of the short code is four, N/SF (=N/4) data symbols are to be transmitted in parallel (simultaneously) by N sub-carriers.

Each data symbol in a sequence of N/SF (=N/4) data symbols is copied as many as the number of symbols that is equal to the sequence length of the short code (which is four in the example of FIG. 3) and these copies are arranged on a frequency axis.

Then, the data symbol sequence arranged on the frequency axis is multiplied by the short code. Further, the data symbol sequence arranged on the frequency axis, which now has the sequence length N as a result of the multiplication of the short code, is multiplied by the long code.

Note that, in the example of FIG. 3, at a time of multiplying the short code, each data symbol is copied and these copies are arranged on the frequency axis first and then the short code is multiplexed, but it is also possible to use a procedure in which each data symbol is spread by using the short code, then multiplied by the long code, and then the long code multiplied data symbol sequence is arranged along the frequency axis direction, or a procedure in which each data symbol is spread by using a product of the short code and the long code first and then the spread data symbol sequence is arranged along the frequency axis direction.

Using the method for multiplying the spreading codes shown in FIG. 3, it is possible to realize a transmission scheme which transmits signals by using a plurality of sub-carriers carries by arranging copies of the data symbol on a frequency axis and multiplying each of them with the short and long spreading codes on that frequency axis.

In this way, even in the case of using the multi-carrier CDMA scheme, it becomes possible to allocate the spreading codes efficiently, by multiplying the long code in addition to the conventionally used spreading by using the short code.

Figure 4A:
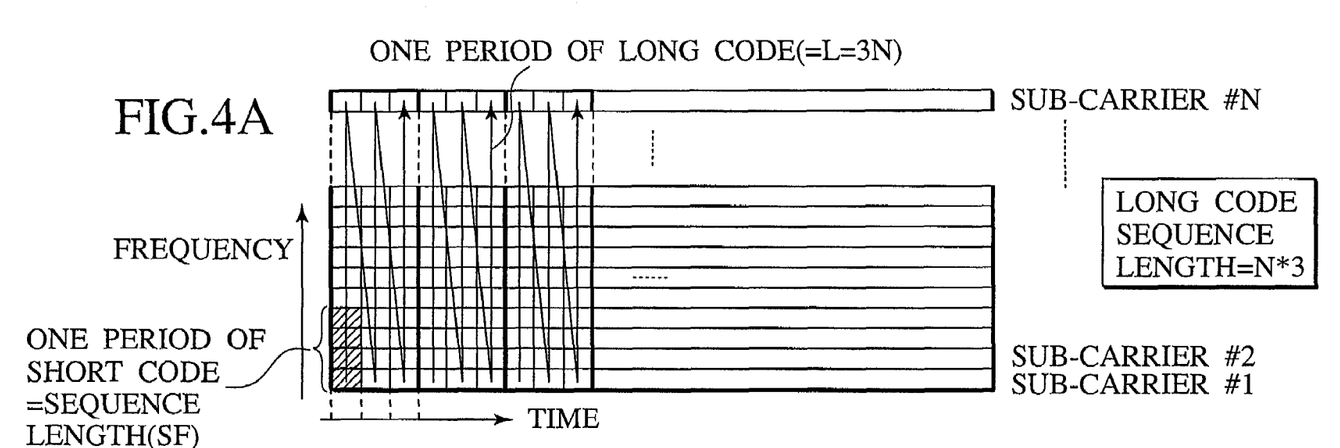
FIGS. 4A and 4B are diagrams showing other exemplary methods for multiplying the spreading codes with the data symbols at a radio base station of the mobile communication system in the multi-carrier CDMA scheme according to one embodiment of the present invention.
Figure 4B:
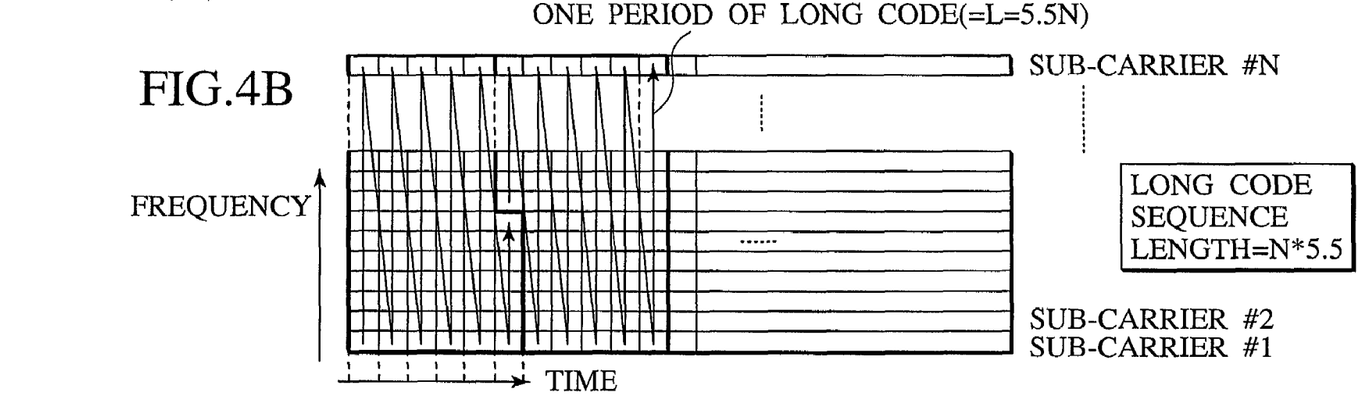

FIGS. 4A and 4B show other exemplary methods for multiplying the spreading codes with the data symbols at a time of transmitting signals at a radio base station of the mobile communication system in the multi-carrier CDMA scheme according to this embodiment.

FIG. 4A shows an exemplary case of multiplying the spreading code when the sequence length L of the long code is three times the number of sub-carriers N, i.e., L=3N. In the example shown in FIG. 4A, three data symbol sequences on the frequency axis which are to be transmitted simultaneously are collectively multiplied by the long code.

FIG. 4B shows an exemplary case of multiplying the spreading code when the sequence length L of the long code is 5.5 times the number of sub-carriers N, i.e., L=5.5N. In the example shown in FIG. 4B, first five data symbol sequences and sub-carriers up to the sub-carrier #N/2 of the sixth data symbol sequence on the frequency axis which are to be transmitted simultaneously are collectively multiplied by the long code, and then sub-carriers starting from the sub-carrier #N/2+1 of the sixth data symbol sequence and the subsequent five data symbol sequences on the frequency axis which are to be transmitted simultaneously are collectively multiplied by the long code.

In the multi-carrier CDMA scheme, the channel estimation value for each sub-carrier becomes necessary at a time of carrying out the despreading and coherent demodulation. In order to derive this channel estimation value, there is a need for the averaging of the pilot symbol along the time direction for each sub-carrier, and for this reason the spreading patterns of the long codes must be different along the time direction for different base stations. The methods for multiplying the spreading codes shown in FIGS. 4A and 4B can make the spreading patterns of the long codes different along the time direction for different base stations.

Figure 5A:
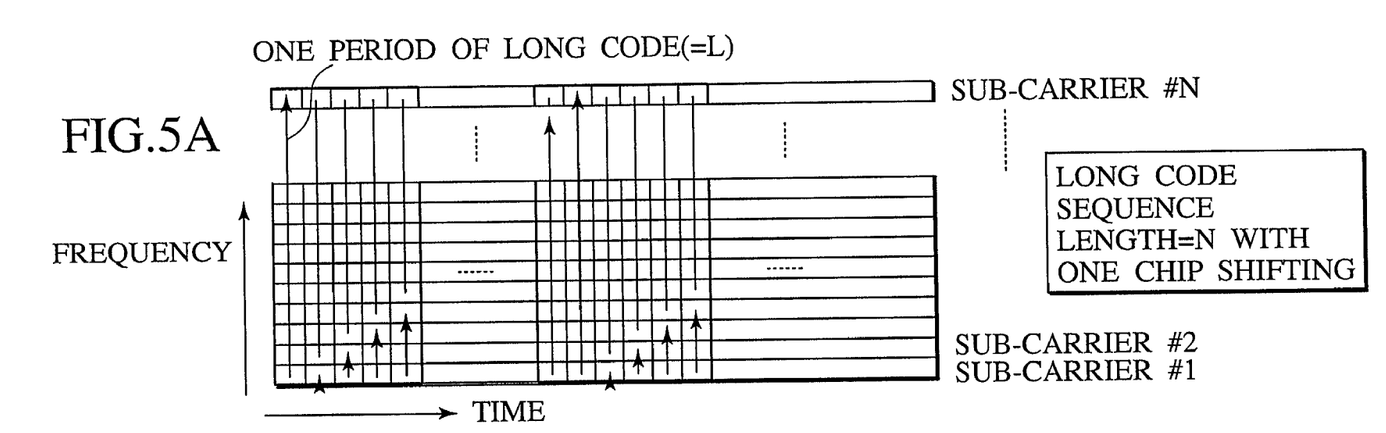
FIGS. 5A and 5B are diagrams showing other exemplary methods for multiplying the spreading codes with the data symbols at a radio base station of the mobile communication system in the multi-carrier CDMA scheme according to one embodiment of the present invention.
Figure 5B:
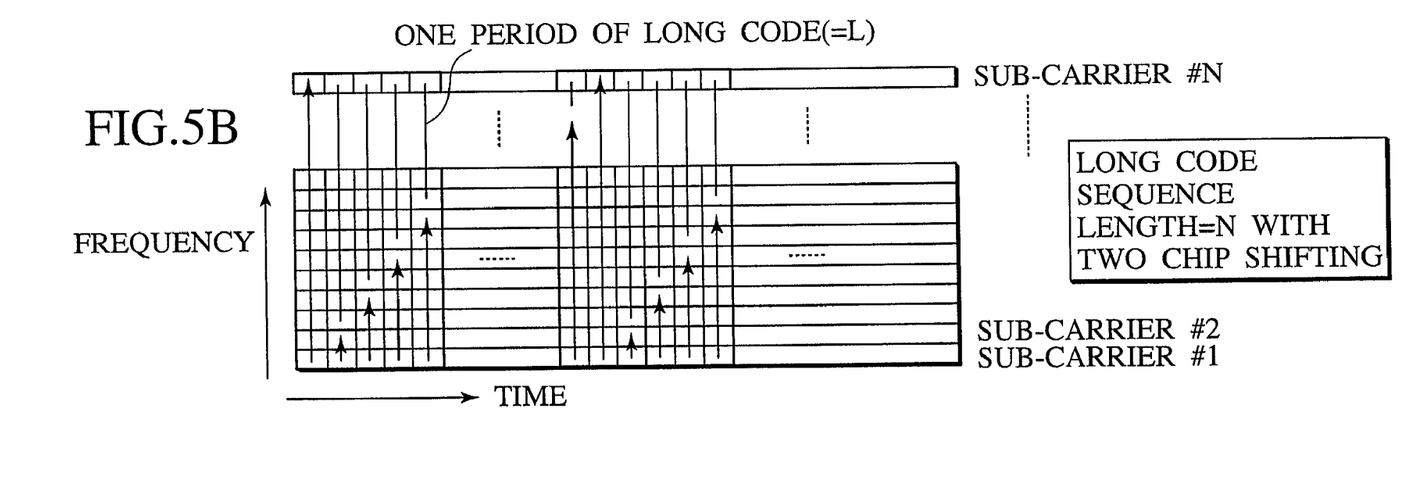

FIGS. 5A and 5B show other exemplary methods for multiplying the spreading codes with the data symbols at a time of transmitting signals at a radio base station of the mobile communication system in the multi-carrier CDMA scheme according to this embodiment. In examples shown in FIGS. 5A and 5B, the sequence length L of the long code equal to the number of sub-carriers N is used.

FIG. 5A shows an exemplary case in which, at a time of multiplying the long code along the frequency direction, the long code to be multiplied with each one of different data symbol sequences on the time axis is sequentially shifted from an immediately previous one by one chip part in the frequency direction, that is, by one copied data symbol part.

FIG. 5B shows an exemplary case in which, at a time of multiplying the long code along the frequency direction, the long code to be multiplied with each one of different data symbol sequences on the time axis is sequentially shifted from an immediately previous one by two chip part in the frequency direction, that is, by two copied data symbol part.

In this way, using the method for multiplying the spreading codes shown in FIG. 5, it is possible to multiply the long code not only in the frequency axis direction but also in the time axis direction. For this reason, it becomes possible to distinguish signals from each cell at a time of integrating the pilot symbol in the time direction in order to carry out the channel estimation in each sub-carrier, so that it becomes possible to carry out the channel estimation at high precision.

Figure 6:
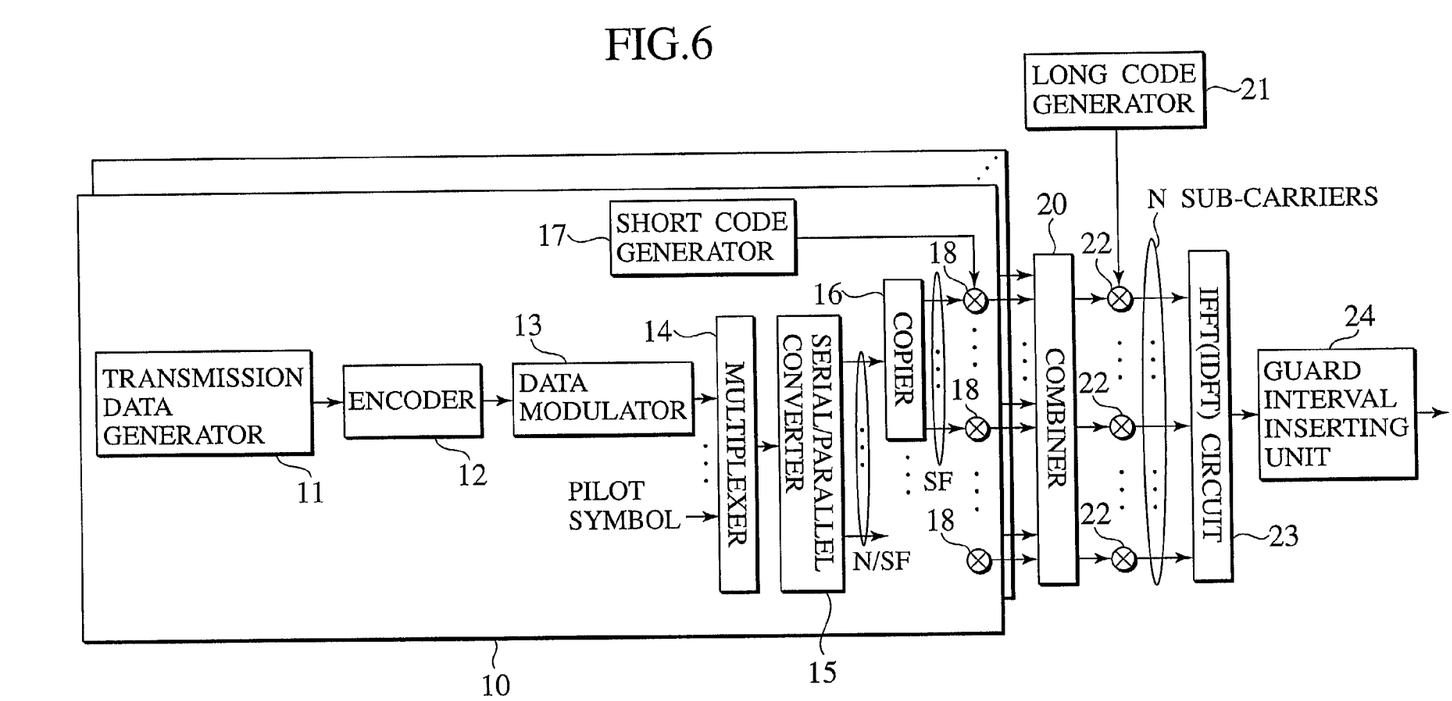
FIG. 6 is a block diagram showing one exemplary configuration of a transmitter at a radio base station of the mobile communication system in the multi-carrier CDMA scheme according to one embodiment of the present invention.
Figure 7:
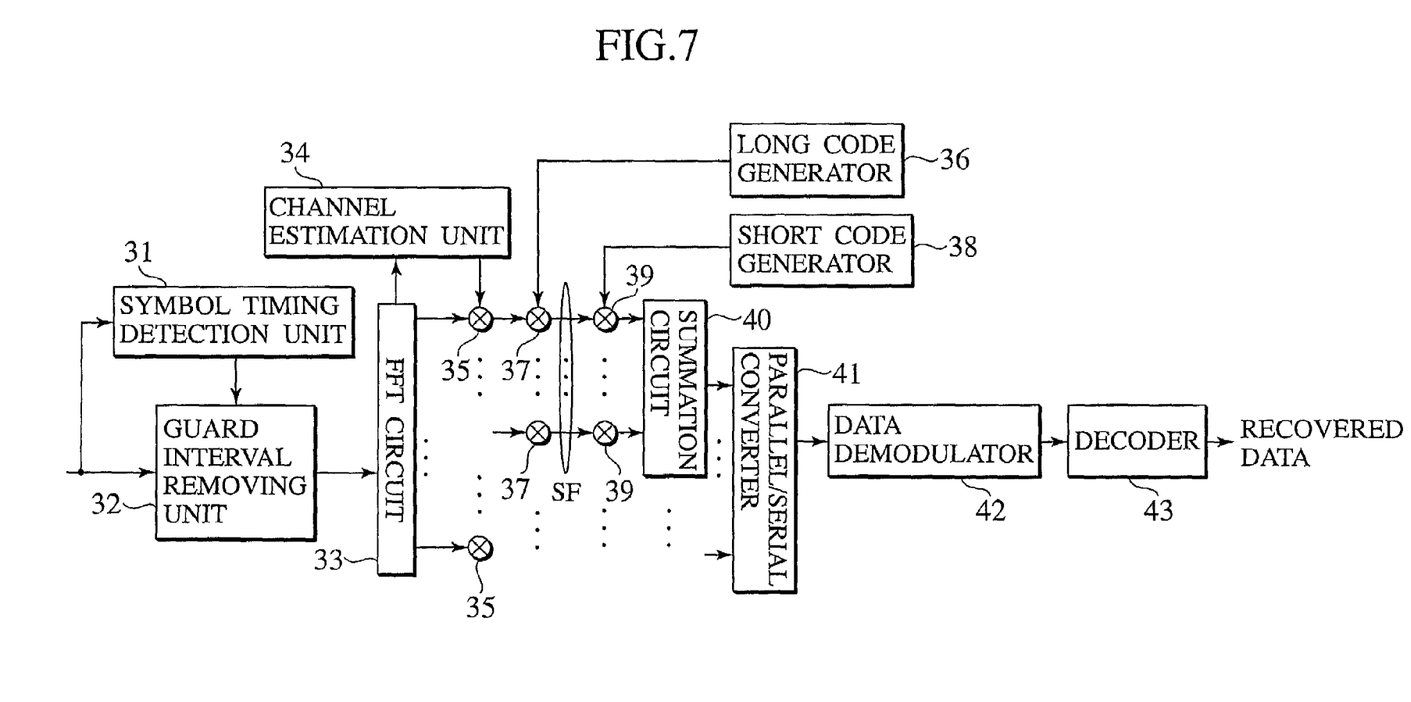
FIG. 7 is a block diagram showing one exemplary configuration of a receiver at a mobile station of the mobile communication system in the multi-carrier CDMA scheme according to one embodiment of the present invention.

FIG. 6 shows one exemplary configuration of a transmitter (to be provided at a radio base station) and FIG. 7 shows one exemplary configuration of a corresponding receiver (to be provided at a mobile station) that can be used in the mobile communication system in the multi-carrier CDMA scheme according to this embodiment.

The transmitter of FIG. 6 comprises a transmission data generator 11 for generating transmission data, an encoder 12 for encoding the transmission data, a data modulator 13 for modulating the encoded transmission data, a multiplexer 14 for multiplexing the modulated and encoded transmission data with a pilot symbol, a serial/parallel converter 15 for applying a serial to parallel conversion to an output of the multiplexer 14, a copier 16 for copying each output of the serial/parallel converter 15, a short code generator 17 for generating the short code, a plurality of multipliers 18 for multiplying the outputs of the copier 16 by the short code, a combiner 20 for combining outputs of the multipliers 18, a long code generator 21 for generating the long code, a plurality of multipliers 22 for multiplying outputs of the combiner 20 by the long code, an IFFT (Inverse Fast Fourier Transform) or IDFT (Inverse Discrete Fourier Transform) circuit 23 for applying the IFFT or IDFT processing to N sub-carriers outputted from the multipliers 22, and a guard interval insertion unit 24 for inserting a GI (Guard Interval) to an output of the IFFT or IDFT circuit 23.

In this configuration of FIG. 6, a section 10 containing the transmission data generator 11, the encoder 12, the data modulator 13, the multiplexer 14, the serial/parallel converter 15, the copier 16, the short code generator 17 and the multipliers 18 is provided in multiple sets.

The receiver of FIG. 7 comprises a symbol timing detection unit 31 for detecting the symbol timing in the received signals, a guard interval removing unit 32 for removing the GI from the received signals, the FFT (Fast Fourier Transform) circuit 33 for applying the FFT processing to an output of the guard interval removing unit 32, a channel estimation unit 34 for carrying out the channel estimation, a plurality of multipliers 35 for multiplying an output of the channel estimation unit 34 with outputs of the FFT circuit 33, a long code generator 36 for generating the long code, a plurality of multipliers 37 for multiplying outputs of the multipliers 35 by the long code, a short code generator 38 for generating the short code, a plurality of multipliers 39 for multiplying each short code sequence length SF part of outputs of the multipliers 37 by the short code, a summation circuit 40 for summing each short code sequent length SF part of outputs of the multipliers 39, a parallel/serial converter 41 for applying a parallel to serial conversion to outputs of the summation circuit 40, a data demodulator 42 for demodulating an output of the parallel/serial converter 41, and a decoder 43 for decoding an output of the data demodulator 42 to obtain the recovered data.

Figure 8:
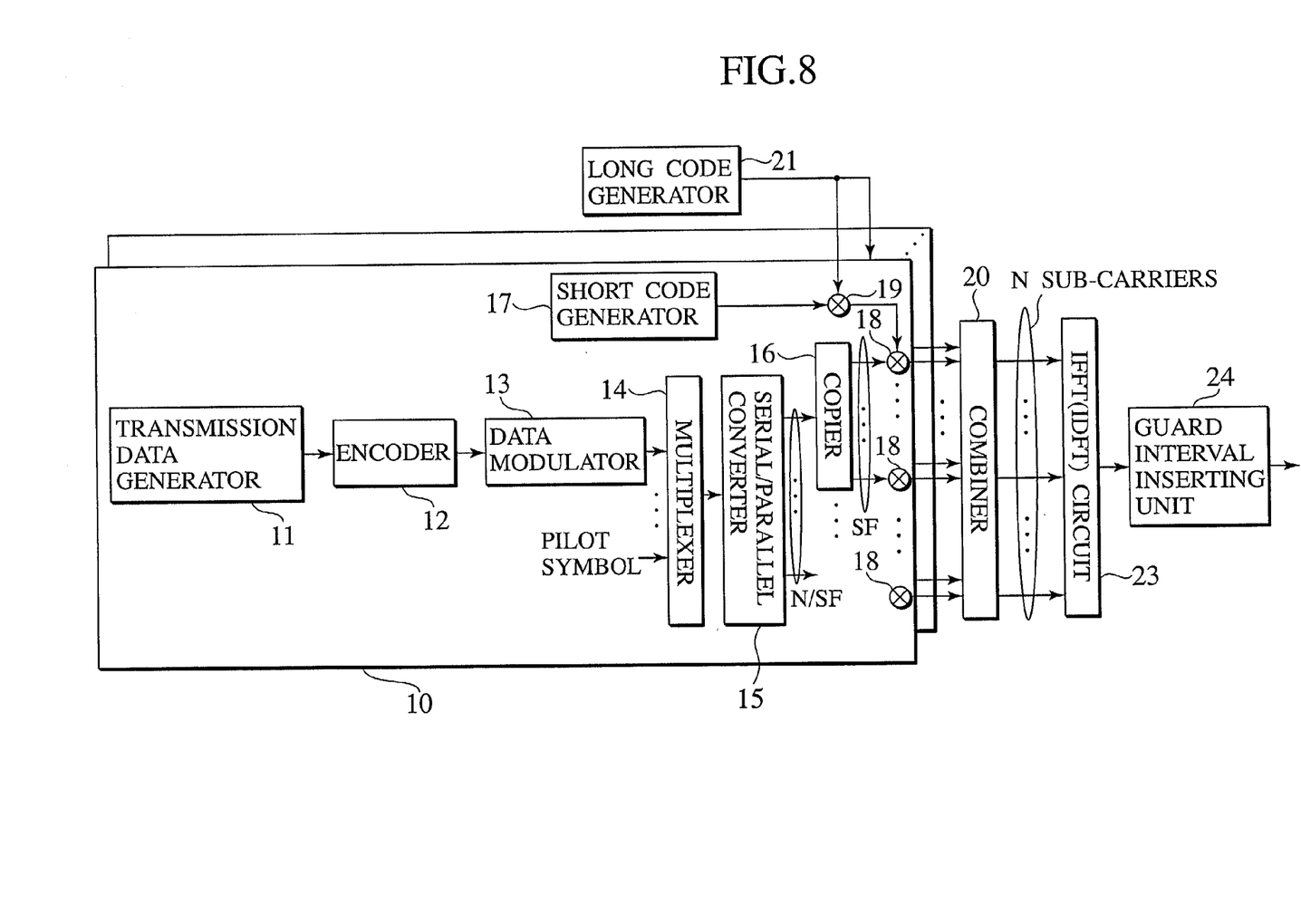
FIG. 8 is a block diagram showing another exemplary configuration of a transmitter at a radio base station of the mobile communication system in the multi-carrier CDMA scheme according to one embodiment of the present invention.
Figure 9:
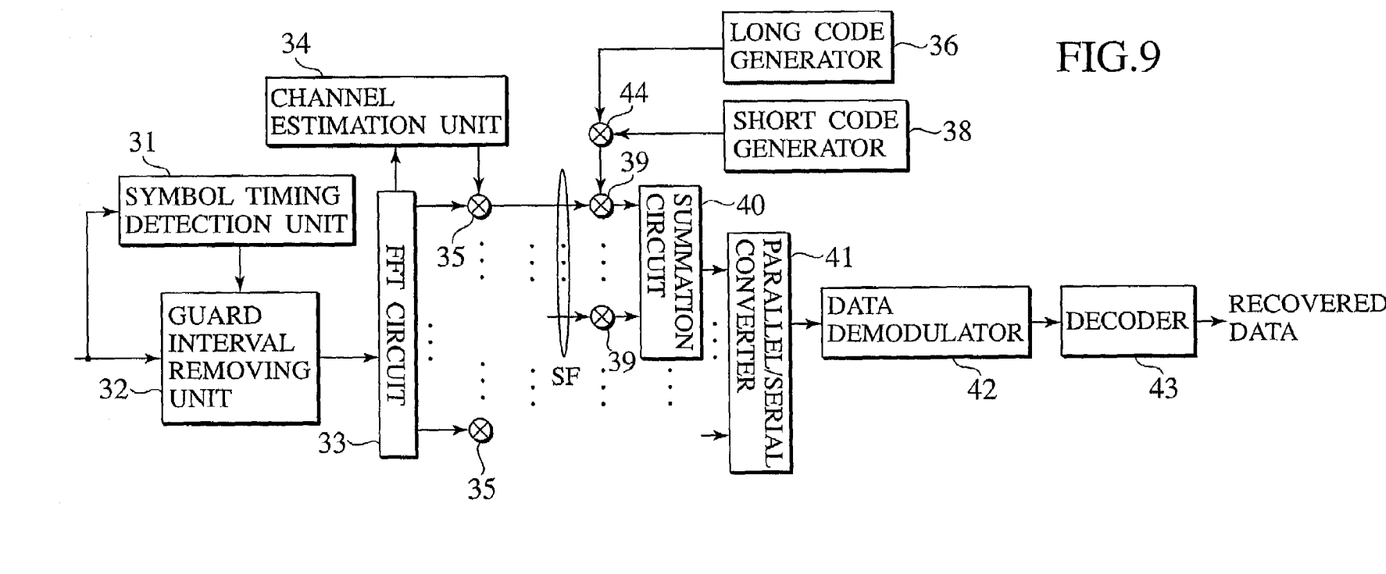
FIG. 9 is a block diagram showing another exemplary configuration of a receiver at a mobile station of the mobile communication system in the multi-carrier CDMA scheme according to one embodiment of the present invention.

FIG. 8 shows another exemplary configuration of a transmitter (to be provided at a radio base station) and FIG. 9 shows another exemplary configuration of a corresponding receiver (to be provided at a mobile station) that can be used in the mobile communication system in the multi-carrier CDMA scheme according to this embodiment, where the same reference numerals as in FIG. 6 and FIG. 7 are given to the corresponding elements.

The transmitter of FIG. 8 differs from that of FIG. 6 in that a multiplier 19 for multiplying an output of the short code generator 17 by the long code is provided between the short code generator 17 and the multipliers 18 in the section 10, instead of the multipliers 22 used in the configuration of FIG. 6.

The receiver of FIG. 9 differs from that of FIG. 7 in that a multiplier 44 for multiplying an output of the short code generator 38 by the long code is provided between the short code generator 38 and the multipliers 39, instead of the multipliers 37 used in the configuration of FIG. 7.

Figure 10:
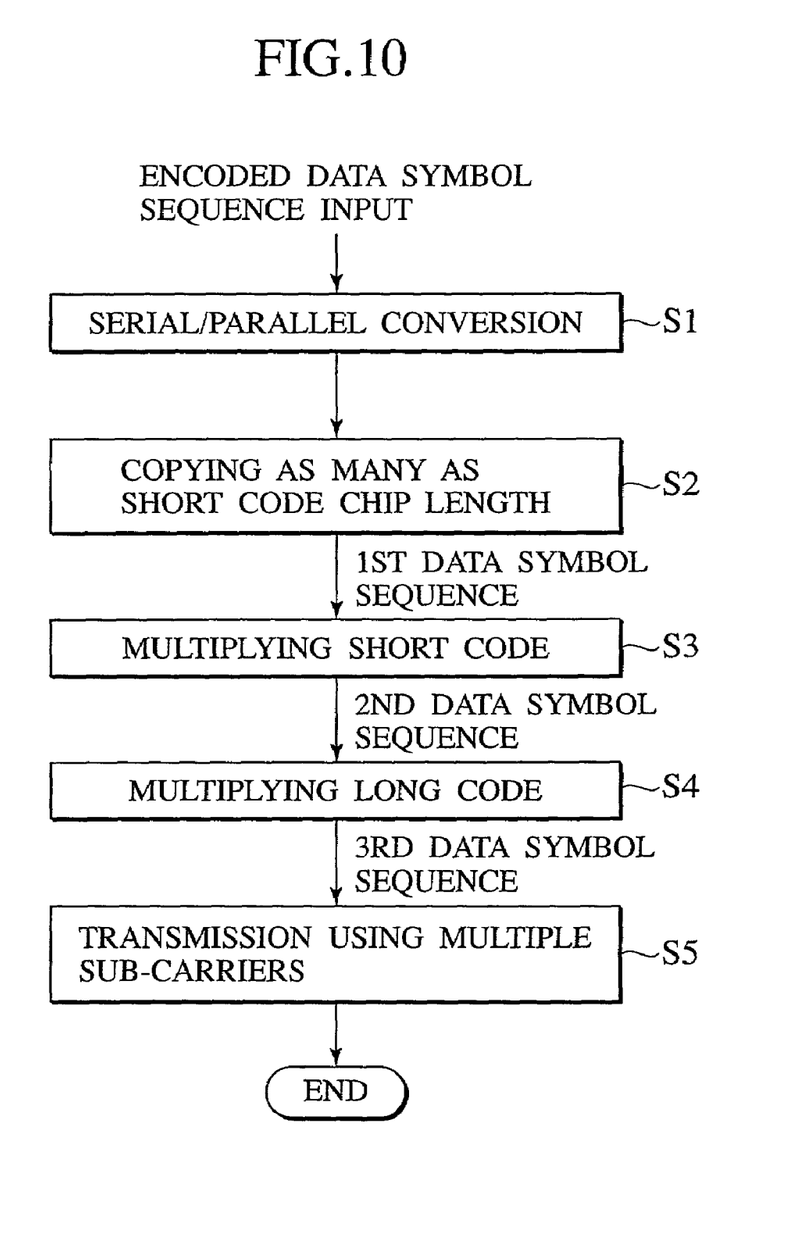
FIG. 10 is a flow chart showing a processing procedure for transmitting signals by the transmitter shown in FIG. 6 or FIG. 8.

The transmitter of FIG. 6 operates according to the flow chart of FIG. 10 as follows.

First, the transmission data sequence entered from the transmission data generator 11 is encoded by the encoder 12 and modulated by the data modulator 13. Then, the encoded and modulated transmission data sequence is multiplexed with the pilot symbol at the multiplexer 14, and the serial to parallel conversion is applied by the serial/parallel converter 15 (step S1). In a serial to parallel converted sequence of N/SF data symbols, each data symbol is copied as many as the number of symbols equal to the short code sequence length (chip length) by the copier 16, and these copies are arranged on the frequency axis (step S2) to obtain the first data symbol sequence.

Then, the first data symbol sequence arranged on the frequency axis is multiplied by the short code at the multipliers 18 (step S3) to obtain the second data symbol sequence.

Then, the short code multiplied second data symbol sequences on the frequency axis in the sequence length N are combined by the combiner 20, and the combined second data symbol sequence is multiplied by the long code at the multipliers 22 (step S4) to obtain the third data symbol sequence.

Then, the long code multiplied third data symbol sequence in the sequence length N is entered into the IFFT circuit 23 and the guard interval inserting unit 24, to obtain the orthogonal multi-carrier signals with N sub-carriers. These orthogonal multi-carrier signals are then transmitted using multiple carriers (step S5).

In the case of the transmitter of FIG. 8, the steps S3 and S4 are unified such that the first data symbol sequence is multiplied by a product of the short code and the long code.

Figure 11:
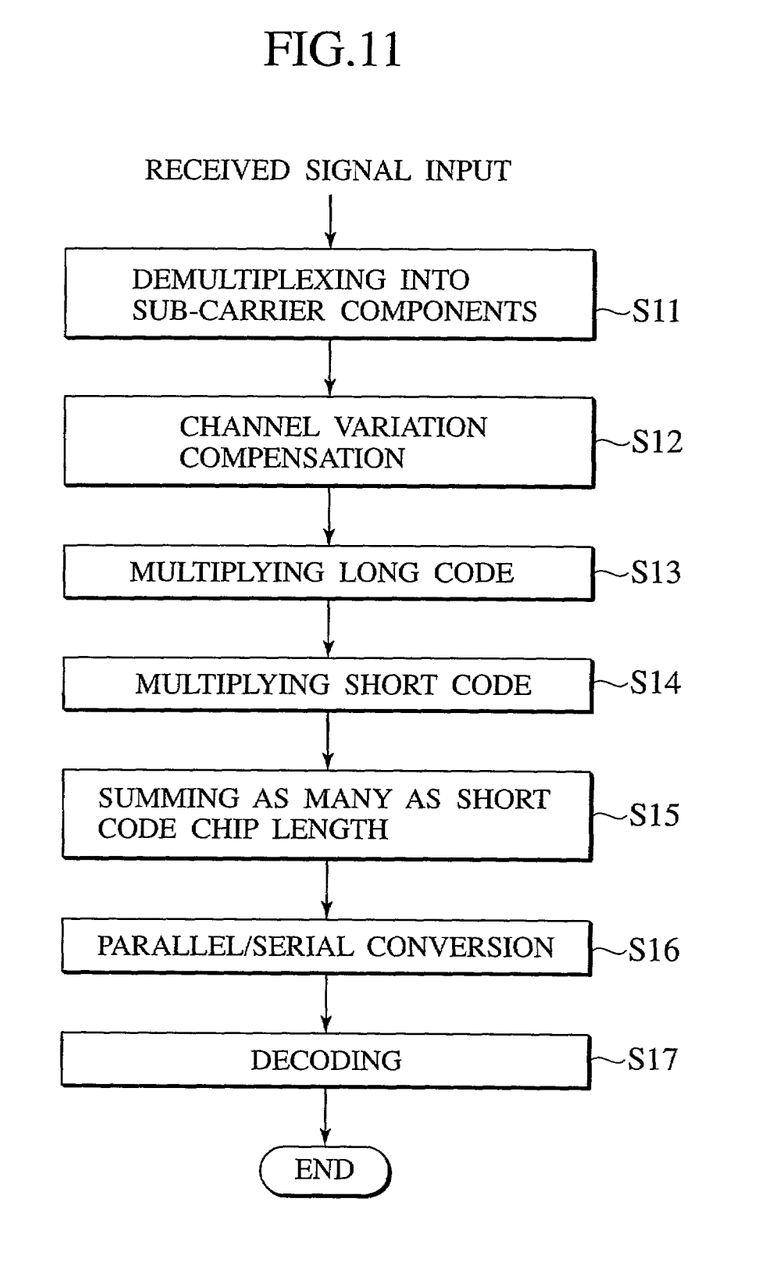
FIG. 11 is a flow chart showing a processing procedure for receiving signals by the receiver shown in FIG. 7 or FIG. 9.

The receiver of FIG. 7 operates according to the flow chart of FIG. 11 as follows.

First, the symbol timing (FFT timing) is detected by the symbol timing detection unit 31, the guard interval is removed by the guard interval removing unit 32, and the resulting signals are demultiplexed into sub-carrier components by the FFT circuit 33 (step S11). Then, the channel variation value of each sub-carrier is estimated at the channel estimation unit 34, and the channel variation is compensated at the multipliers 35 (step S12).

Then, the channel variation compensated symbols of each sub-carrier are multiplied by the long code in the sub-carrier direction at the multiplier 37 (step S13), and the long code multiplied symbols are multiplied by the corresponding short code in the sub-carrier direction at the multiplier 39 (step S14). Then, as many symbols as the short code sequence length (chip length) SF are summed at the summation circuit 40 (step S15) to obtain the despread symbols.

Then, the parallel to serial conversion is applied to the despread symbols at the parallel/serial converter 41 (step S16), and the resulting data are demodulated at the data demodulator 42 and decoded at the decoder 43 to obtain the recovered data (step S17).

In the case of the receiver of FIG. 9, the steps S13 and S14 are unified such that the symbols of each channel variation compensated sub-carrier are multiplied by a product of the short code and the long code.

In the transmitter of FIG. 6 or FIG. 8 and the receiver of FIG. 7 or FIG. 9, the long code generator may generate the long code in various ways.

For example, in the case of using the method for multiplying the spreading codes shown in FIGS. 4A and 4B, the long code generator can store all the long codes to be used in the system in a memory, and read out the long code to be used for the data transmission from the memory at a time of the data transmission. Alternatively, the long code generator can store formulae for generating the long codes in a memory, and read out a formula for generating the long code to be used for the data transmission and generate that long code according to the read out formula at a time of the data transmission.

Similarly, in the case of using the method for multiplying the spreading codes shown in FIGS. 5A and 5B, the long code generator can store all the long codes to be used in the system in a memory, and read out the long code to be used for the data transmission from the memory and shift the read out long code by using a shifter at a time of the data transmission. Alternatively, the long code generator can store formulae for generating the long codes in a memory, and read out a formula for generating the long code to be used for the data transmission, generate that long code according to the read out formula, and shift the generated long code by using a shifter at a time of the data transmission.

As described, in the mobile communication system in the multi-carrier CDMA scheme according to the present invention, data to be transmitted by the radio base station are doubly spread by using long code that is unique to each cell and to be used in identifying each cell, in addition to the user identifying code (spreading code) to be used in identifying each user. More specifically, the long code having a repetition period longer than or equal to the number of sub-carriers is used.

In addition, it is possible to multiply the long code not only along the frequency direction but also along the time direction by shifting the long code sequentially in the frequency direction, such that it becomes possible to distinguish signals from each cell at a time of integrating the pilot symbols in a time direction in order to carry out the channel estimation in each sub-carrier.

Thus, according to the present invention, it becomes possible to allocate the spreading codes efficiently in the downlink of the mobile communication system in the multi-carrier CDMA scheme.

In addition, it becomes possible to improve the channel estimation precision and identify each radio base station even in the case of using the multi-carrier CDMA scheme in which the data symbol sequences are spread along the frequency axis direction.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the transmitter of FIG. 6 or FIG. 8 and the receiver of FIG. 7 or FIG. 9 of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for transmitting signals from a radio base station in a mobile communication system, the method comprising the steps of:
   (a) copying each data symbol of a data symbol sequence to be transmitted and arranging copied data symbols on a frequency axis;
   (b) doubly spreading the data symbol sequence, to obtain a spread data symbol sequence, by multiplying the copied data symbols arranged on the frequency axis by spreading codes including a short code and a long code, the short code being a code having a repetition period equal to a number of copies made from one data symbol and to be multiplied in the frequency axis direction, and the long code being a code having a repetition period longer than the number of copies made from one data symbol and longer than a number of sub-carriers and to be multiplied in the frequency axis direction and a time axis direction; and
   (c) transmitting the spread data symbol sequence by using a plurality of sub-carriers.

2. The method of claim 1, wherein the step (b) multiplies one short code selected from a set of short codes that are commonly allocated to all radio base stations and to be used in identifying mobile stations, and one long code selected from one or more long codes that are uniquely allocated to each radio base station and to be used in identifying each base station.

3. The method of claim 1, wherein the step (b) obtains a short code multiplied data symbol sequence whose symbols are transmitted simultaneously which has a sequence length equal to the number of the sub-carriers by multiplying the short code, and then obtains the spread data symbol sequence by multiplying a plurality of short code multiplied data symbol sequences collectively by the long code.

4. A method for transmitting signals from a radio base station in a mobile communication system, the method comprising the steps of:
   (a) copying each data symbol of a data symbol sequence to be transmitted and arranging copied data symbols on a frequency axis;
   (b) doubly spreading the data symbol sequence to obtain a spread data symbol sequence by obtaining a short code multiplied data symbol sequence whose symbols are transmitted simultaneously and which has a sequence length equal to a number of the sub-carriers by multiplying the copied data symbols arranged on the frequency axis by the short code, which has a repetition period equal to a number of copies made from one data symbol, and then multiplying a plurality of short code multiplied data symbol sequences by the long code, which has a repetition period longer than the number of copies made from one data symbol and equal to the number of sub-carriers, while sequentially shifting the long code to be multiplied with each one of different short code multiplied data symbol sequences on a time axis from the long code multiplied with an immediately previous short code multiplied data symbol sequence by one or plural data symbol part in a frequency direction; and (e) transmitting the spread data symbol sequence by using a plurality of sub-carrier.

5. A method for receiving signals at a mobile station in a mobile communication system in which a radio base station transmits signals by copying each data symbol of a data symbol sequence to be transmitted and arranging copied data symbols on a frequency axis, multiplying the copied data symbols arranged on the frequency axis by the spreading codes, and transmitting a spreading code multiplied data symbol sequence by using a plurality of sub-carriers, the method comprising the steps of:

(a) receiving a spread data symbol sequence transmitted from the radio base station by using a plurality of sub-carriers; and (b) doubly despreading the spread data symbol sequence, to obtain a despread data symbol sequence, by multiplying the spread data symbol sequence by spreading codes including a short code and a long code, the short code being a code having a sequence length shorter than that of the long code and to be multiplied in a frequency axis direction, and the long code being a code having a repetition period longer than a number of copies made from one data symbol and longer than a number of sub-carriers and to be multiplied in the frequency axis direction and a time axis direction, and combining a number of spreading code multiplied data symbols equal to the sequence length of the short code wherein, the short code is a spreading code having a repetition period equal to a number of copies made from one data symbol.

6. The method of claim 5, wherein the step (b) multiplies one short code selected from a set of short codes that are commonly allocated to all radio base stations and to be used in identifying mobile stations, and one long code selected from one or more long codes that are uniquely allocated to each radio base station and to be used in identifying each base station.

7. A transmitter device for transmitting signals from a radio base station in a mobile communication system, the transmitter device comprising:

a copying unit configured to copy each data symbol of a data symbol sequence to be transmitted and arrange copied data symbols on a frequency axis;

a spreading unit configured to doubly spread the data symbol sequence, to obtain a spread data symbol sequence, by multiplying the copied data symbols arranged on the frequency axis by spreading codes including a short code and a long code, the short code being a code having a repetition period equal to a number of copies made from one data symbol and to be multiplied in the frequency axis direction, and the long code being a code having a repetition period longer than the number of copies made from one data symbol and longer than a number of sub-carriers and to be multiplied in the frequency axis direction and a time axis direction; and a transmitting unit configured to transmit the spread data symbol sequence by using a plurality of sub-carriers.

8. The transmitter device of claim 7, wherein the spreading unit multiplies one short code selected from a set of short codes that are commonly allocated to all radio base stations and to be used in identifying mobile stations, and one long code selected from one or more long codes that are uniquely allocated to each radio base station and to be used in identifying each base station.

9. The transmitter device of claim 7, wherein the spreading unit obtains a short code multiplied data symbol sequence whose symbols are transmitted simultaneously and which has a sequence length equal to the number of the sub-carriers by multiplying the short code, and then obtains the spread data symbol sequence by multiplying a plurality of short code multiplied data symbol sequences collectively by the long code.

10. A transmitter device for transmitting signals from a radio base station in a mobile communication system, the transmitter device comprising:

a copying unit configured to copy each data symbol of a data symbol sequence to be transmitted and arrange copied data symbols on a frequency axis;

a spreading unit configured to doubly spread the data symbol sequence to obtain a spread data symbol sequence by obtaining a short code multiplied data symbol sequence whose symbols are transmitted simultaneously and which has a sequence length equal to a number of the sub-carriers by multiplying the copied data symbols arranged on the frequency axis by the short code, which has a repetition period equal to a number of copies made from one data symbol, and then by multiplying a plurality of short code multiplied data symbol sequences by the long code, which has a repetition period longer than the number of copies made from one data symbol and equal to the number of sub-carriers, while sequentially shifting the long code to be multiplied with each one of different short code multiplied data symbol sequences on a time axis from the long code multiplied with an immediately previous short code multiplied data symbol sequence by one or plural data symbol part in a frequency direction; and a transmitting unit configured to transmit the spread data symbol sequence by using a plurality of sub-carriers.

11. A receiver device for receiving signals at a mobile station in a mobile communication system in which a radio base station transmit signals by copying each data symbol of a data symbol sequence to be transmitted and arranging copied data symbols on a frequency axis, multiplying the copied data symbols arranged on the frequency axis by the spreading codes, and transmitting a spreading code multiplied data symbol sequence by using a plurality of sub-carriers, the receiver device comprising:

a receiving unit configured to receive a spread data symbol sequence transmitted from the radio base station by using a plurality of sub-carriers; and a despreading unit configured to doubly despread the spread data symbol sequence, to obtain a despread data symbol sequence, by multiplying the spread data symbol sequence by spreading codes including a short code and a long code, the short code being a code having a sequence length shorter than that of the long code and to be multiplied in a frequency axis direction, and the long code being a code having a repetition period longer than a number of copies made from one data symbol and longer than a number of sub-carriers and to be multiplied in the frequency axis direction and a time axis direction, and combining a number of spreading code multiplied data symbols equal to the sequence length of the short code wherein, the short code is a spreading code having a repetition period equal to a number of copies made for one data symbol.

12. The receiver device of claim 11, wherein the despreading unit multiplies one short code selected from a set of short codes that are commonly allocated to all radio base stations and to be used in identifying mobile stations, and one long code selected from one or more long codes that are uniquely allocated to each radio base station and to be used in identifying each base station.

13. A computer usable medium having computer readable program codes embodied therein for causing a computer to function as a transmitter device for transmitting signals from a radio base station in a mobile communication system, the computer readable program codes include:

a first computer readable program code for causing said computer to copy each data symbol of a data symbol sequence to be transmitted and arrange copied data symbols on a frequency axis;

a second computer readable program code for causing said computer to doubly spread the data symbol sequence, to obtain a spread data symbol sequence, by multiplying the copied data symbols arranged on the frequency axis by spreading codes including a short code and a long code, the short code being a code having a repetition period equal to a number of copies made from one data symbol and to be multiplied in the frequency axis direction, and the long code being a code having a repetition period longer than the number of copies made from one data symbol and longer than a number of sub-carriers and to be multiplied in the frequency axis direction and a time axis direction; and a third computer readable program code for causing said computer to transmit the spread data symbol sequence by using a plurality of sub-carriers.

14. The computer usable medium of claim 13, wherein the second computer readable program code causes said computer to multiply one short code selected from a set of short codes that are commonly allocated to all radio base stations and to be used in identifying mobile stations, and one long code selected from one or more long codes that are uniquely allocated to each radio base station and to be used in identifying each base station.

15. The computer usable medium of claim 13, wherein the second computer readable program code causes said computer to obtain a short code multiplied data symbol sequence whose symbols are transmitted simultaneously which has a sequence length equal to the number of the sub-carriers by multiplying the short code, and then obtain the spread data symbol sequence by multiplying a plurality of short code multiplied data symbol sequences collectively by the long code.

16. A computer usable medium having computer readable program codes embodied therein for causing a computer to function as a transmitter device for transmitting signals from a radio base station in a mobile communication system, the computer readable program codes include:

a first computer readable program code for causing said computer to copy each data symbol of a data symbol sequence to be transmitted and arrange copied data symbols on a frequency axis;

a second computer readable program code for causing said computer to doubly spread the data symbol sequence to obtain a spread data symbol sequence by obtaining a short code multiplied data symbol sequence whose symbols are transmitted simultaneously which has a sequence length equal to a number of the sub-carriers by multiplying the copied data symbols arranged on the frequency axis by the short code, which has a repetition period equal to a number of copies made from one data symbol, and then by multiplying a plurality of short code multiplied data symbol sequences by the long code, which has a repetition period longer than the number of copies made from one data symbol and equal to the number of sub-carriers, while sequentially shifting the long code to be multiplied with each one of different short code multiplied data symbol sequences on a time axis from the long code multiplied with an immediately previous short code multiplied data symbol sequence by one or plural data symbol part in a frequency direction; and a third computer readable program code for causing said computer to transmit the spread data symbol sequence by using a plurality of sub-carriers.

17. A computer usable medium having computer readable program codes embodied therein for causing a computer to function as a receiver device for receiving signals at a mobile station in a mobile communication system in which a radio base station transmits signals by copying each data symbol of a data symbol sequence to be transmitted and arranging copied data symbols on a frequency axis, multiplying the copied data symbols arranged on the frequency axis by the spreading codes, and transmitting a spreading code multiplied data symbol sequence by using a plurality of sub-carriers, the computer readable program codes include:

a first computer readable program code for causing said computer to receive a spread data symbol sequence transmitted from a radio base station by using a plurality of sub-carriers; and a second computer readable program code for causing said computer to doubly despread the spread data symbol sequence, to obtain a despread data symbol sequence, by multiplying the spread data symbol sequence by spreading codes including a short code and a long code, the short code being a code having a sequence length shorter than that of the long code and to be multiplied in a frequency axis direction, and the long code being a code having a repetition period longer than a number of copies made from one data symbol and longer than a number of sub-carriers and to be multiplied in the frequency axis direction and a time axis direction, and combining a number of spreading code multiplied data symbols equal to the sequence length of the short code wherein, the short code is a spreading code having a repetition period equal to a number of copies made from one data symbol.

18. The computer usable medium of claim 17, wherein the second computer readable program code for causing said computer to multiply one short code selected from a set of short codes that are commonly allocated to all radio base stations and to be used in identifying mobile stations, and one long code selected from one or more long codes that are uniquely allocated to each radio base station and to be used in identifying each base station.

* * * * *